US009985876B2

United States Patent
Arroyo et al.

(10) Patent No.: US 9,985,876 B2
(45) Date of Patent: May 29, 2018

(54) DETERMINING CABLE CONNECTIONS IN A MULTI-CABLE LINK (71) Applicant: International Business Machines Corporation, Armonk, NY (US)

(72) Inventors: Jesse P. Arroyo, Rochester, MN (US); Christopher J. Engel, Rochester, MN (US); Kaveh Naderi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 14/946,836

(22) Filed: Nov. 20, 2015

(65) Prior Publication Data

US 2017/0149655 A1 May 25, 2017

(51) Int. Cl.
*H04L 5/00* (2006.01)
*H04L 12/725* (2013.01)
*H04L 12/28* (2006.01)

(52) U.S. Cl.
CPC .......... *H04L 45/304* (2013.01); *H04L 5/0092* (2013.01)

(58) Field of Classification Search
CPC .......... H04L 12/40182; H04L 41/0809; H04B 10/2503
USPC .................................................. 398/139, 25
See application file for complete search history.

(56) References Cited

U.S. PATENT DOCUMENTS

| 7,520,321 | B2 | 4/2009 | Hiron et al. |
| 7,694,029 | B2 | 4/2010 | Kubo et al. |
| 8,402,189 | B2 | 3/2013 | Koga et al. |
| 2003/0021580 | A1 | 1/2003 | Matthews |
| 2004/0017806 | A1* | 1/2004 | Yazdy ................... H04L 49/357 370/389 |
| 2007/0280239 | A1 | 12/2007 | Lund |
| 2009/0279889 | A1 | 11/2009 | Kirkpatrick et al. |
| 2010/0237904 | A1* | 9/2010 | Shau ................ H03K 19/01858 326/30 |
| 2011/0283037 | A1 | 11/2011 | Koga et al. |
| 2012/0079139 | A1 | 3/2012 | Sonokawa et al. |
| 2012/0099427 | A1 | 4/2012 | Huang |
| 2012/0229159 | A1 | 9/2012 | Kim et al. |
| 2013/0080678 | A1 | 3/2013 | Buckland et al. |
| 2013/0129360 | A1* | 5/2013 | Zbinden ............. H04B 10/2503 398/139 |
| 2013/0204987 | A1 | 8/2013 | Patani et al. |

(Continued)

FOREIGN PATENT DOCUMENTS

WO 2009137418 A1 11/2009

OTHER PUBLICATIONS

Engel et al., "PHYP MEX Programming Guide," version 4.1, Mar. 17, 2014, pp. 1-77.

(Continued)

*Primary Examiner* — Asad Nawaz
*Assistant Examiner* — Jason Harley
(74) *Attorney, Agent, or Firm* — Nolan M. Lawrence (57) ABSTRACT A method and a system for enabling communications on a signaling link include a first and a second device interconnected by the signaling link. The first device performs the method to acquire information from the second device. Based on the information acquired the first device determines to enable the signaling link for operational communications between the first device and the second device. A computer programming product instructs a computer to perform the method.

5 Claims, 4 Drawing Sheets (56) References Cited

U.S. PATENT DOCUMENTS

2014/0173155 A1\* 6/2014 Slattery .............. G06F 13/4081
710/303
2014/0173156 A1\* 6/2014 Alshinnawi ......... H04L 12/6418
710/305

OTHER PUBLICATIONS

Unknown, "Cable Management," Tier-Based Miscabling Detection, Cisco Dynamic Fabric Automation Configuration Guide, pp. 1-8.
Buckland, P. et al., "Implementing Sideband Control Structure for PCIE Cable Cards and IO Expansion Enclosures," U.S. Appl. No. 14/243,999, filed Apr. 3, 2014.
Buckland, P. et al., "Implementing Sideband Control Structure for PCIE Cable Cards and IO Expansion Enclosures," U.S. Appl. No. 14/628,203, filed Feb. 20, 2015.
Arroyo, J. et al., "Detecting and Configuring of External IO Enclosure," U.S. Appl. No. 14/549,912, filed Nov. 21, 2014.
Arroyo, J. et al., "Detecting and Sparing of Optical PCIE Cable Channel Attached IO Drawer," U.S. Appl. No. 14/549,957, filed Nov. 21, 2014.
Arroyo, J. et al., "Detecting and Sparing of Optical PCIE Cable Channel Attached IO Drawer," U.S. Appl. No. 14/866,931, filed Nov. 21, 2014.
Arroyo, J. et al., "Determining Cable Connections in a Multi-Cable Link", U.S. Appl. No. 14/946,828, filed Nov. 20, 2015.
List of IBM Patents or Patent Applications Treated as Related, signed Nov. 13, 2015, 2 pages.
Arroyo, J. et al., "Determining Cable Connections in a Multi-Cable Link," U.S. Appl. No. 15/139,383, filed Apr. 27, 2016.
U.S. Appl. No. 15/139,383, Accelerated Examination Support Document, dated Apr. 18, 2016, 22 pages.
List of IBM Patents or Patent Applications Treated as Related, Apr. 26, 2016, 2 pages.

\* cited by examiner

DETERMINING CABLE CONNECTIONS IN A MULTI-CABLE LINK

BACKGROUND

The present invention relates to coupling computing devices using IO links, and more specifically to enabling a link for operational communications between the devices.

SUMMARY

According to features of the present disclosure a signaling link connects a first link device to a second link device. A method for enabling the signaling link to perform operational communications between the devices includes disabling signal transmissions on the outbound and inbound channels of the link. The method further includes enabling one of the outbound channels for signal transmission and transmitting, on that channel, a sequence of signals forming outbound data.

According to other features of the method, one of the inbound channels is enabled for signal transmission. A sequence of signals, forming inbound data, is received on the inbound channel. Based on the inbound data signifying that the signaling link may be used for operational communications between the link devices, the link is enabled for those communications. In some embodiments the inbound data includes information identifying the second link device, an electromechanical enclosure containing the second link device, and/or a connector location coupled to the second link device and to which the signaling link is connected.

Aspects of the method may be implemented as a computer program product having instructions to direct a computer to perform the method. A system that includes a first and a second link device connected by a signaling link may be configured to perform the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to electronic signaling links connecting two devices, more particular aspects relate to determining to enable the link for operational communications between the devices. While the present disclosure is not necessarily limited to such applications, various aspects of the disclosure may be appreciated through a discussion of various examples using this context.

In computing systems a signaling link may connect components of a computer (e.g., processors and/or memory) to IO devices, or to IO slots that may plug IO devices. For example, a PCI-Express (PCIE) link may be used to connect components of a computer to a PCIE device (e.g., a PCIE switch or an IO adapter) or a PCIE slot that may plug a PCIE IO adapter. Other example links include SCSI, SAS, SATA, Fiber Channel, and other, similar, IO buses interconnecting processors and memories in a computer to peripheral IO devices.

Signaling links may be formed of bidirectional "lanes", each lane carrying one bit of information forming a multi-bit datum, such as a byte of data. For example, a PCIE link may be eight or sixteen lanes in width, carrying, respectively, eight or sixteen bits of data. A bidirectional lane may include an outbound and an inbound channel, in which the outbound channel conveys signals, or data, from a link element in a first device (e.g., a computer) to a link element in a second device (e.g., an IO device). The inbound channel conveys signals, or data, in the reverse direction, from the link element in second device to the link element in the first device.

In some systems, the components of the computer and the IO devices or IO slots may reside in different electromechanical enclosures, or "chassis". For example, the processors and memory of a computer may reside in (or, be "packaged" within) a system enclosure and IO devices or IO slots may reside in (or, be "packaged" within) an IO expansion enclosure (or, "IO drawer"). In such a system, the computer (e.g., a processor or memory within the computer) may be connected to the IO devices or slots by means of one or more cables. For example, a PCIE link may be used to connect components of a computer in a system chassis to a PCIE slot, or a PCIE device, that may reside in an IO drawer that is a separate chassis from that of the system chassis. The PCIE link may be formed of two or more cables (e.g., ribbon, flex, or optical cables), and each cable may carry a subset of the lanes forming the PCIE link.

A signaling link may include link initialization sequences prior to establishing operational communications between devices connected by the link. Operational communications may include exchanging data between the devices, or one device operating, by means of the link, to control the other. Enabling operational communications may be an automated aspect of the link initialization. For example, hardware included in the devices may initialize signaling on the link and may complete that initialization in a state enabled for operational communications. Alternatively, enabling a link for operational communications may involve interaction between hardware in communication with the link and firmware, or software, operating in a device in communication with the link.

In systems connecting a computer to an IO device by means of a signaling link it may be necessary for the computer to determine information regarding the IO device prior to enabling the signaling link for operational, or various other, communications between the device and the computer. This may be necessary whether reaching a state capable of operational communications is automated, or interactive between hardware and firmware (or, software). For example, in a system utilizing one or more cables to interconnect a signaling link the cable(s) forming the link may be connected to an IO drawer, or a device in an IO drawer, that is not permitted to communicate with the computer. The computer may need to authenticate the identity of that IO drawer or IO device, or the type or model of the IO drawer, prior to enabling the link for operational communications. In another example, the cable(s) forming the link may be connected to incorrect connection locations of an IO device or IO drawer. The computer may need to determine that cable(s) forming the link is, or, are connected to correct location(s) of the IO drawer or IO device prior to enabling the link for operational communications.

In cases such as these, it may not be permissible, or may not be possible, to enable a link for operational communications to obtain the information to verify that the link may actually be enabled. According to the features of the present disclosure, a system may, alternatively, enable only a subset of the channels of a signaling link for one link device to obtain information from another link device. The system may use the information to determine whether to enable the link for operational, or other, communications.

For purposes of understanding the aspects of disclosure, a computer connecting to an IO device in an IO drawer provides an example embodiment. For purposes of further understanding the disclosure, a PCIE link having sixteen lanes, formed of a low byte and high byte cable, is an example embodiment of a signaling link to connect the computer to the IO device. However, it would be apparent to one of ordinary skill in the art that a variety of devices, other than a computer and an IO device, may be interconnected using cables forming a link, and the manner in which to apply the present disclosure to such other systems. It would be further apparent to one of ordinary skill in the art that embodiments may employ a variety of other types of links (e.g., SAS, or Fiber Channel, among those previously disclosed).

Figure 1:
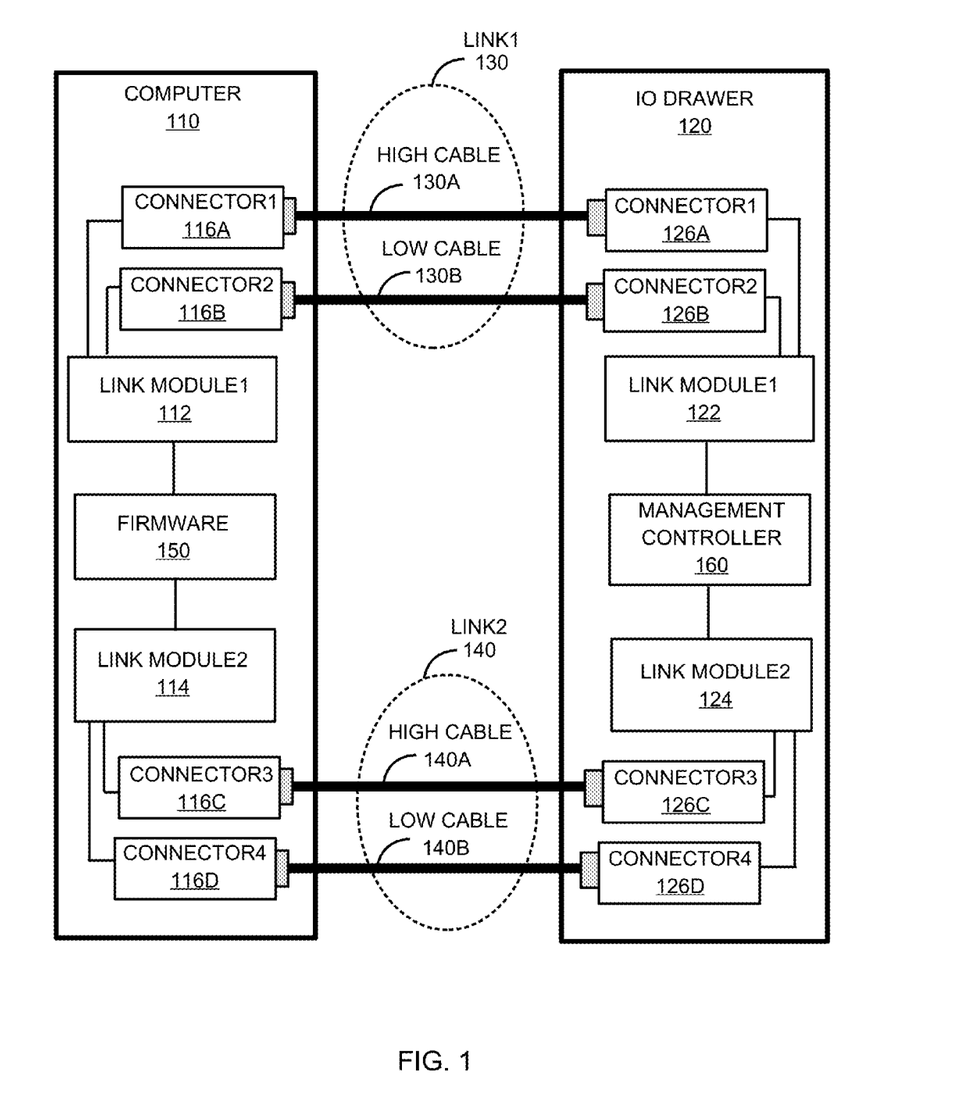
FIG. 1 is a block diagram illustrating a system having devices connected by a signaling link, according to aspects of the present disclosure.

FIG. 1 illustrates an example computer system 100 having a computer 110 connecting to an IO drawer 120 using multi-cable links, LINK1 130 and LINK2 140. Each of the links utilizes a low and a high cable, LINK1 having high cable 130A and low cable 130B, and LINK2 having high cable 140A and low cable 140B. A link may be formed of a number of signaling lanes, and each cable forming a link may convey a subset of the totality of the lanes. The high cable may convey eight lanes forming the high-order byte of a sixteen-lane PCIE link, for example, and the low cable may convey eight lanes forming the low-order byte of that PCIE link.

Various embodiments may employ more than two cables to form a link. For example, a link may be a sixteen-lane PCIE link and may be formed of four cables, each conveying four of the sixteen lanes. In another example, a sixteen-lane link may be formed of 3 cables, in which one cable conveys 8 lanes (e.g., lanes zero to seven) and the other two cables each convey 4 lanes (e.g., lanes eight through eleven and lanes twelve through fifteen, respectively).

In an embodiment, devices connecting cables forming a link may provide connectors (or, connection locations) to connect the cables. The computer 110 provides connectors for each of the four cables that form LINK1 and LINK2. The computer CONNECTOR1 116A and CONNECTOR2 116B provide high and low connectors, respectively, for the LINK1 high and low cables. The computer CONNECTOR3 116C and CONNECTOR4 116D provide high and low connectors, respectively, for the LINK2 high and low cables. Similarly, the IO drawer 120 includes connectors for each cable. The IO drawer CONNECTOR1 126A and CONNECTOR2 126B provide high and low connectors, respectively, for the LINK1 cables. The IO drawer CONNECTOR3 126C and CONNECTOR4 126D provide high and low connectors, respectively, for the LINK2 cables.

Embodiments may couple the connectors to link modules and signals conveyed in the link cables may thereby be coupled to the link modules. The computer CONNECTOR1 and CONNECTOR2 are coupled to LINK MODULE1 112, and CONNECTOR3 and CONNECTOR4 are coupled to LINK MODULE2 114. Similarly, IO drawer CONNECTOR1 and CONNECTOR2 are coupled to IO drawer LINK MODULE1 122 and IO drawer CONNECTOR3 and CONNECTOR4 are coupled to IO drawer LINK MODULE2 124.

A link module, such as the computer 110 LINK MODULE1 and LINK MODULE2 and the IO drawer 120 LINK MODULE1 and LINK MODULE2, may include signaling apparatus, such as opto-electrical transceivers, where the cables are optical cables. A link module may include various status and control signals associated with the link, with lanes forming the link, with each connector, or with each cable. The status and control signals may include signals to enable and disable signal transmission, and may include status indicating signal reception, for one or more lanes included in the link.

An embodiment may include firmware, such as firmware 150 included in the computer 110, and in various embodiments the firmware may be in communication with link modules, such as the computer LINK MODULE1 and LINK MODULE2. The firmware may read status or set control signals in the link modules. For example, the firmware may set a "transmit enable" signal included in a link module to enable a lane of the link to transmit signals. The firmware may read a "signal received" status signal included in a link module to determine that signals are received on a lane of the link.

The firmware may also operate to manage the links. For example, the firmware may determine operability of the links and may initialize or enable signal transmission on the links. The firmware may determine the connectors (or, connection locations) at an IO drawer that connect to cables forming a particular link of the computer (e.g., cables connected to the computer CONNECTOR1 and CONNECTOR2). The firmware may determine to enable signal transmission on the links according to whether or not the link is operable, or whether or not the cables forming the link are connected from the same link of the computer to the same link of an IO drawer.

A multi-cable link may require that cables forming a link from connectors corresponding to a particular link of one device connect to corresponding (e.g., high and low byte) connectors of a particular link of a second device. For example, the LINK1 high cable connects from the computer CONNECTOR1 (high byte of LINK1) to CONNECTOR1 of the IO drawer, corresponding to the high cable (high byte) connector of one link of the IO drawer. The LINK1 low cable connects from the computer CONNECTOR2 (low byte of LINK1) to the IO drawer CONNECTOR2 (low byte) of the IO drawer link that includes the IO drawer CONNECTOR1. Similarly, the LINK2 high cable and low cable connect the PCIE link high and low byte computer CON- NECTOR3 and CONNECTOR4 to the respective PCIE high and low byte IO drawer CONNECTOR3 and CONNECTOR4.

An embodiment may include a management controller within an IO drawer, such as the management controller 160 included in the IO drawer 120. A management controller may be coupled to, or in communication with, a link module. For example, in FIG. 1 the management controller 160 is coupled to the IO drawer link modules LINK MODULE1 and LINK MODULE2. A management controller may, in an embodiment, be able to access status and control signals within the link modules. Also, in an embodiment, a management controller may receive or send data by means of the lanes coupled to a link module, or by means of status and control signals within the link modules.

Figure 2A:
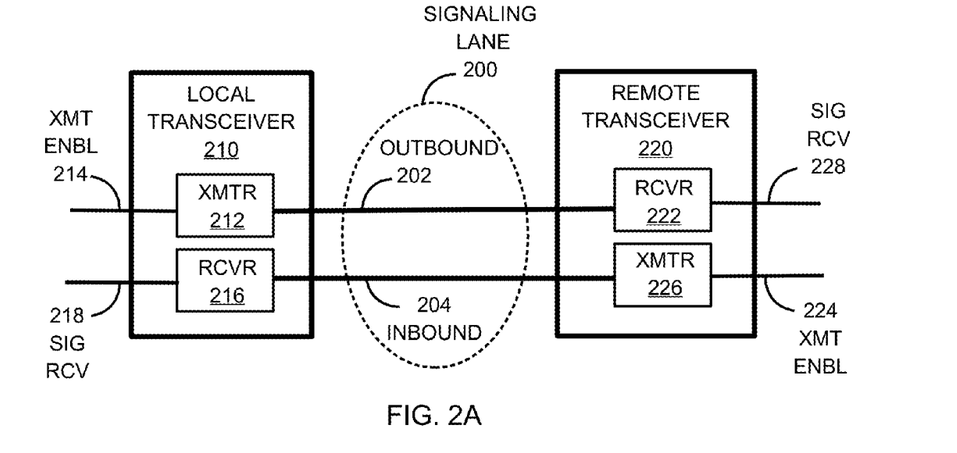
FIG. 2A is a block diagram illustrating a bidirectional signaling lane within a cable included in a signaling link, according to features of the disclosure.

FIG. 2A illustrates an example signaling lane 200 that may be included in a link, according to aspects of the disclosure. Using the example of a sixteen-lane PCIE link, a multi-cable PCIE link may be formed of two cables, each having eight signaling lanes conveying one byte of PCIE data. In FIG. 2A, as a frame of reference, one end of a lane within a link is designated as "local" and the other end is designated as "remote". In an embodiment, for example, the local end of a PCIE link may be a computer, and the remote end of a PCIE link may be an IO drawer.

A signaling lane may be formed with signal "channels" conveying signals in one direction or the other. The signaling lane 200 is formed with two signal channels, an outbound channel 202, and an inbound channel 204, where (for purposes of illustration) "outbound" and "inbound" are relative to the local end of the lane.

In embodiments signal transmission and reception on the channels may be by means of transceivers. A transceiver may include a transmitter to send signals on a channel (e.g., an outbound channel), and may include a receiver to receive signals on a channel (e.g., an inbound channel). A transceiver may include a control signal to enable or disable sending signals on a channel. A transceiver may include a status signal to signify receiving signals on a channel.

For example, local transceiver 210 provides for signal transmission and receipt on each channel at the local end of the lane 200, having a signal transmitter 212 and a signal receiver 216. The transmitter sends signals on the outbound channel from the local transceiver to the remote transceiver. The transmitter includes an input control signal XMT ENBL (transmit enable) 214, to enable or disable signal transmission on the outbound channel. The receiver receives signals on the inbound channel transmitted from the remote transceiver. The receiver includes an output status signal, SIG RCV (signal received) 218, which indicates receiving signals on the inbound channel.

The signaling lane 200 is connected at the remote end to a remote transceiver 220, which includes a receiver 222 and a transmitter 226. The remote transceiver operates similarly to the local transceiver. The remote receiver receives signals on the outbound channel transmitted from the local transceiver and SIG RCV 228 is an output status signal that indicates receiving signals on that outbound channel. The transmitter 226 transmits signals on the inbound channel from the remote transceiver to the local transceiver. The XMT ENBL 224 is an input control signal to enable or disable the transmitter sending signals on the inbound channel.

In some embodiments, a signaling lane may be an optical fiber in a cable, and an embodiment may include opto-electronic transceivers, such as the local and remote transceivers in FIG. 2A embodied as opto-electronic transceivers.

Figure 2B:
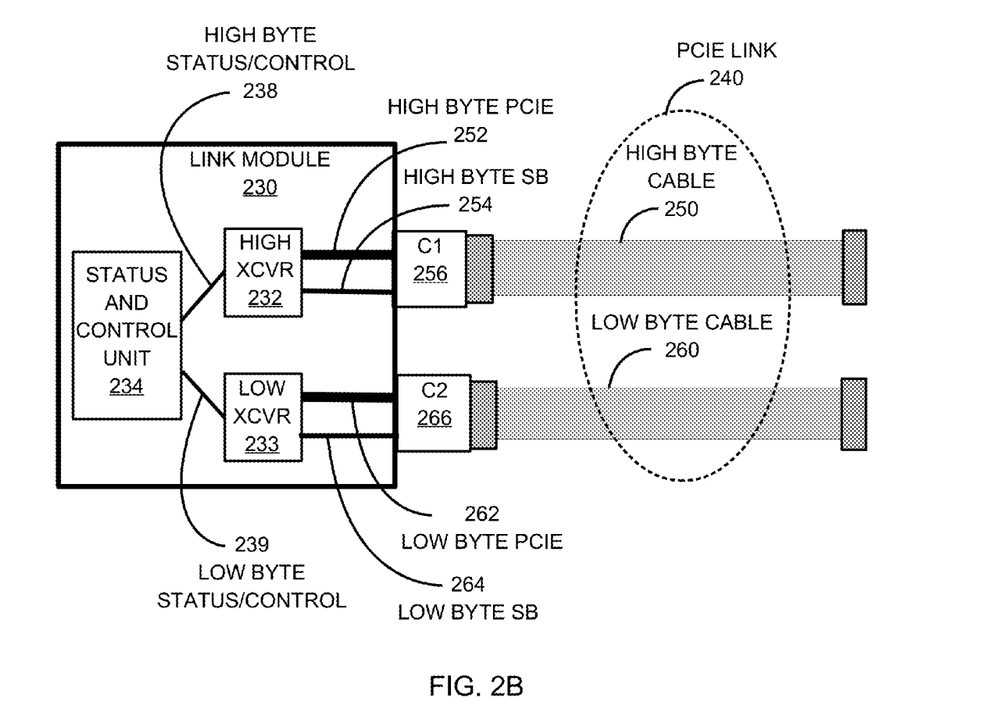
FIG. 2B is a block diagram illustrating a signaling link and a link module, according to features of the disclosure.

FIG. 2B illustrates an example multi-cable link and link module, according to features of the disclosure. PCIE link 240 is formed of two cables, a high byte cable 250 and a low byte cable 260. The high byte cable conveys lanes eight to fifteen of the PCIE link, shown as high byte PCIE 252, and mates to connector C1 256. The low byte cable conveys lanes zero to seven of the PCIE link, shown as low byte PCIE 262, and mates to connector C2 266. In embodiments, the cables may be fiber-optic cables, and each cable may include individual fibers, in which each fiber conveys one channel (e.g., an inbound or an outbound channel) of one lane included in a cable.

The connectors may couple the lanes within a cable to transceivers, such as the local and remote transceivers disclosed in FIG. 2A. For purposes of understanding the disclosure of FIG. 2B, "outbound" and "inbound" are with reference to the end of the cable connected to the link module 230. The link module includes a high byte transceiver 232 and a low byte transceiver 233. The high byte transceiver transmits eight lanes of PCIE outbound channel signals and receives eight lanes of PCIE inbound channel signals, forming the high byte of the PCIE link 240. The low byte transceiver also transmits eight lanes of PCIE outbound channel signals and receives eight lanes of PCIE inbound channel signals, forming the low byte of the PCIE link.

A link module may include a status and control unit such as status and control unit 234 included in the link module 230. The status and control unit may receive "signal received" status or may provide "transmit enable" controls, such as disclosed in FIG. 2A, and the signal received status or transmit enable controls may be included for each of the lanes in the high and low byte transceivers. In FIG. 2B the status and control unit receives high byte status/control 238 from the high transceiver and receives low byte status/control 239 from the low transceiver.

In some embodiments a cable may include a sideband link. As shown in FIG. 2B the high byte cable includes the sideband link 254 and the low byte cable includes the sideband link 264. In embodiments a sideband link may be a single signaling lane, or may be formed of multiple signaling lanes. A sideband link may be coupled to a link module status and control unit, and may convey status, such as signal received, for any lane of the PCIE link. A sideband link may access control signals, such as a transmit enable, for any lane of the PCIE link.

In some embodiments, a sideband link in one cable may act as an alternative communications path to a sideband link in another cable. For example, the high byte sideband link may be a primary path to access, from the local end of the link, signal received status in a remote link module. The low byte sideband link may be a backup path to access the status, from the local end of the link, if, for example, the high byte sideband link is not operable in one or both directions.

In embodiments a transceiver, such as the high and low transceivers of FIG. 2B, may, in some phases of operating a lane, transmit a continuous stream of signals. A status and control unit may be coupled to a local or remote end of the lane and may include signal received status representing that the stream is being properly received on that lane (or, an inbound or outbound channel included in that lane). For example, a sequence of signals may form a "training packet". A transceiver may transmit, on an outbound channel of the lane, a continuous sequence of training packets, such as during link initialization or reset periods. A signal received on the inbound end of a lane may represent that the training sequence is properly received on that inbound channel. In embodiments a sideband lane may be used to read, from a local end of a link, signal received status for that or other lanes recorded in a status and control unit included in a remote link module connected to that sideband lane.

Figure 3:
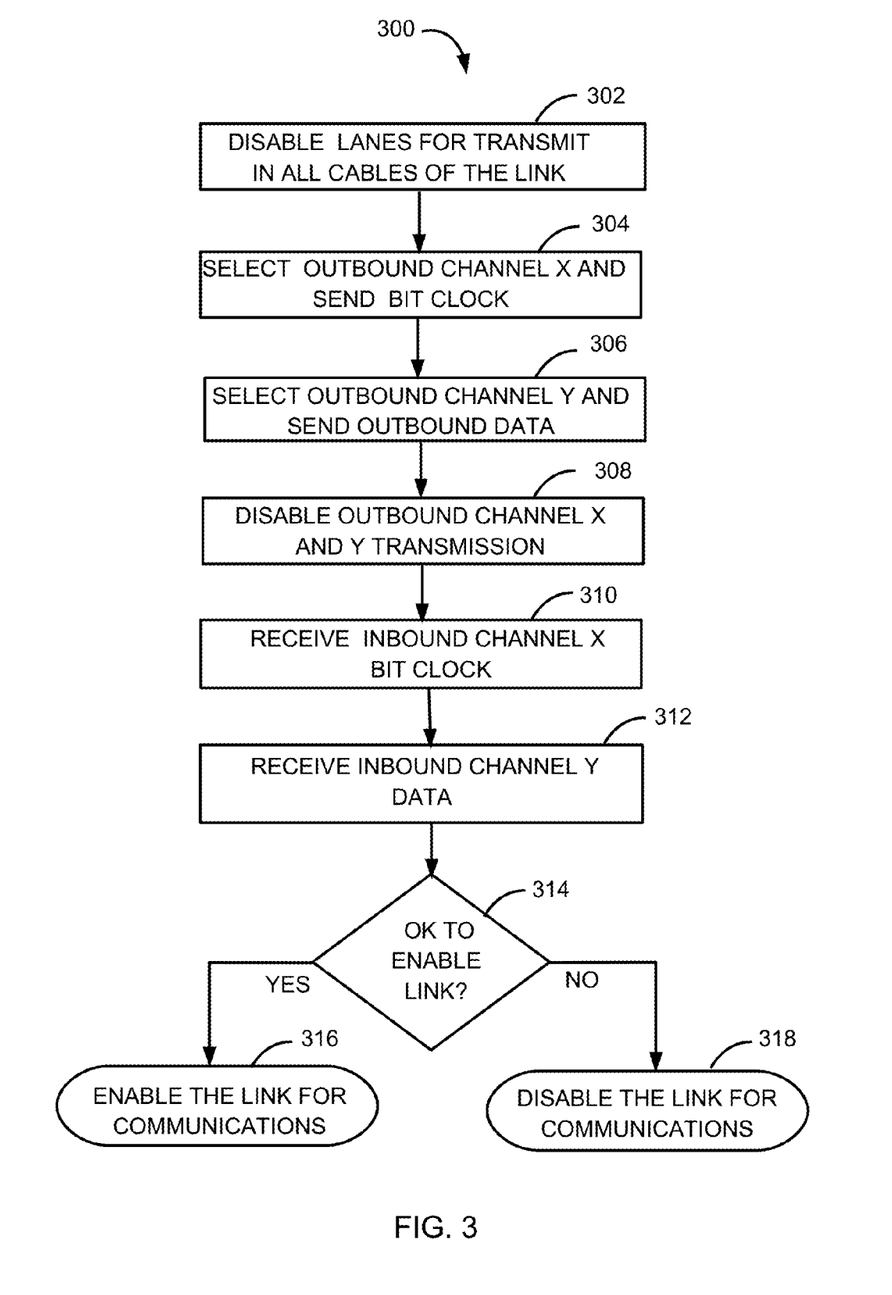
FIG. 3 is a flowchart illustrating an example method for enabling a signaling link, according to aspects of the disclosure.

FIG. 3 illustrates an example method 300 of activating a signaling link between two devices. One device (or, components thereof) may utilize the method to determine aspects of a second device connected by a signaling link to the first device. The first device may utilize the method to determine other aspects of the second device or of the link connecting the device. For example, the first device may utilize the method to determine the identity of the second device, or to determine the connector location of the second device that is connected to a cable of the first device. Having an understanding of the disclosure, it would be evident to one of ordinary skill in the art that the method may be utilized by embodiments for one device to determine a variety of aspects of a second device connected by a signaling link to the first device.

For purposes of illustrating the method of FIG. 3, the first device may be a computer and the second device may be an IO drawer, a component of an IO drawer, or a device therein ("IO drawer", hereinafter, referring interchangeably to any of the foregoing). The computer may be connected by means of a PCIE link to the IO drawer. The PCIE link may include one or more signaling lanes, and may be formed of one or more cables conveying the PCIE lanes between the computer and the IO drawer. Cables conveying the PCIE lanes may include a sideband link. Lanes forming the PCIE link, or a sideband link, may be bidirectional signaling lanes, such as disclosed in FIG. 2A. However, it would be evident to one of ordinary skill in the art that any of a variety of devices may be connected by any of a variety of types of links, and that links may be formed of a single cable or a plurality of cables, where cables are employed to connect the link between the devices.

Further, for purposes of understanding the method, the method may be described as performed by firmware operating in the computer. According to aspects of the method, the firmware may perform the method to determine the identity of the IO drawer, or to determine the connector location on the IO drawer for each cable connecting the computer to the IO drawer. The firmware may make such determinations for purposes of enabling the link for operational communications between the computer and the IO drawer.

It would be evident to one of ordinary skill in the art that any of a variety of components of a first device, other than firmware, may perform the method, including hardware (e.g., power-on hardware circuits), or a combination of firmware and hardware, operating in the device. Another device coupled to, or in communication with, the first device—including the second device—may perform the method.

At 302 the firmware disables signal transmission on lanes of the PCIE link such that the link is not enabled for operational communications between the computer and the IO drawer. In embodiments, the firmware may disable lanes of other links (such as a sideband link) that may be included in cables conveying the PCIE lanes. At 302 the IO drawer, a management controller (such as disclosed in FIG. 1), or other components of the IO drawer (such as power-on hardware circuits), may disable signal transmission from the IO drawer to the computer on lanes of the PCIE link. The firmware may use a sideband link to disable signal transmission, on the PCIE or other lanes, from the IO drawer to the computer.

At 304 the firmware selects a lane ("lane X") within a cable forming the link to serve as an outbound clocking lane. For purposes of establishing a frame of reference to illustrate the method, "outbound" refers to signals transmitted from the computer to the IO drawer. Correspondingly, "inbound" refers to signals transmitted from the IO drawer to the computer.

The firmware, at 304, enables signal transmission from the computer to the IO drawer on the outbound channel ("outbound channel X") of the selected lane to form a clock signal. The clock signal establishes a bit clock for purposes of synchronizing data sent on the outbound channel of one or more other lanes in the cable(s) forming the link. At 306 the firmware selects an outbound channel ("outbound channel Y") from among lanes within the cables forming the link, for purposes of sending data. The firmware, at 306, sends outbound data on outbound channel Y in synchronization with the clock signal sent on outbound channel X.

In embodiments, the IO drawer may itself enable receiving outbound signal transmission on outbound channels X or Y. In other embodiments the firmware may enable the IO drawer to receive outbound signal transmission on outbound channels X or Y, and the firmware may use a sideband link to perform the enablement. In some embodiments, the signals transmitted on an outbound data channel may be "self-clocking". Accordingly, outbound data sent on outbound channel Y may be self-clocking, and, correspondingly, the firmware may, at 304, omit selecting an outbound channel X on which to transmit a clock signal. Also in some embodiments, the firmware may select a plurality of outbound channels to, collectively, form outbound "channel Y". A link may include a sideband bidirectional lane, and outbound channel Y may be the outbound channel of the sideband lane.

The lanes selected as outbound clocking and data lanes (channels X and Y) may be lanes of the signaling link (e.g., PCIE), may be lanes of a sideband link, or may be a combination of both lanes of the signaling link and lanes of a sideband link. For example, outbound channel X may be the outbound channel of a PCIE lane included in a PCIE link. In another embodiment, outbound channel X may be the outbound channel of a lane included in a sideband link. Similarly, outbound channel Y may be the outbound channels of one or more PCIE lanes, or may be the outbound channels of one or more lanes of a sideband link. The lanes may be included in the same cable; or, the lanes may be lanes of any of the cables forming a link, in the case that the link may be formed of a plurality of cables. For example, outbound channels X and Y may be included in the same cable, or may be included in different cables, in a link formed of more than one cable.

The outbound data may include, for example, the identity of the computer, authentication data (e.g., a private encryption or security key), or information directing the IO drawer to respond with information describing the IO drawer. The IO drawer may include a management controller and the management controller may be in communication with channels X and Y. For example, channels X and Y may be received in the IO drawer at a link module and the management controller may be in communication with the link module to receive the outbound data.

At 308, the firmware completes transmitting the outbound data to the IO drawer and disables signal transmission on outbound channels X and Y. At 310, the firmware (or, a component of the computer operating on behalf of the firmware) receives a bit clock on the inbound channel ("inbound channel X") of lane X. Inbound channel X may be the inbound channel of the same lane X as that of 304. Alternatively, inbound channel X may be the inbound channel of another lane included in the cable(s) forming the link.

In embodiments, the firmware may select inbound channel X, and the firmware may enable signal transmission on inbound channel X at the IO drawer utilizing outbound data sent at 306. The firmware may use a sideband link to enable the IO drawer signal transmission on inbound channel X. In other embodiments, the IO drawer may select inbound channel X, and the selection may be in response to the outbound data received at the IO drawer. The IO drawer may include a management controller and the management controller (or, other components of the IO drawer) may select inbound channel X and may enable signal transmission on inbound channel X.

At 312 the firmware receives inbound data on the inbound channel ("inbound channel Y") of one or more lanes included in the link, or included in the cables forming a link. The inbound data may be received, by the computer, on inbound channel Y in synchronization with the clock received on inbound channel X. Alternatively, the inbound data may be self-clocking and the firmware (or, the computer) may, at 310, omit receiving a clock on inbound channel X. Inbound channel Y may be the inbound channel of the same lane(s) as used at 306 to send outbound data. Alternatively, inbound channel Y may be the inbound channel(s) of another lane (or, lanes) included in the cable(s) forming the link.

In embodiments, the firmware may select inbound channel Y, and the firmware may enable signal transmission on inbound channel Y at the IO drawer utilizing outbound data sent at 306. The firmware may use a sideband link to enable the IO drawer to transmit signals on inbound channel Y. In other embodiments, the IO drawer may select inbound channel Y, and the selection may be in response to the outbound data sent at 306 and received by the IO drawer. The IO drawer may include a management controller and the management controller (or, other components of the IO drawer) may select inbound channel Y and may enable signal transmission on inbound channel Y. In various embodiments, the inbound channels X and Y may be lanes of the signaling link (e.g., PCIE), may be lanes of a sideband link, or may be a combination of both lanes of the signaling link and lanes of a sideband link. Inbound channels X and Y may be included in the same cable; or, the inbound channels X and Y may be included in different cables, in a link formed of more than one cable.

The inbound data received by the firmware, at 312, may identify the IO drawer, or may identify a location at the IO drawer to which a cable of the PCIE link is connected. The inbound data may include security or encryption keys that may authenticate the identity of the IO drawer. The IO drawer may include a management controller and the management controller may be in communication with the inbound channels X and Y. The management controller may generate the inbound data.

At 314 the firmware processes the inbound data to determine whether it is permissible to enable the link for operational communications between the devices (e.g., between the computer and the IO drawer). The firmware may, for example, use the inbound data to determine the identity of the IO drawer to authenticate that the IO drawer is permitted to communicate with the computer, or the computer to communicate with the IO drawer. Authenticating the identity of the IO drawer may include verifying that the type, model, or serial number of the IO drawer matches those that the computer supports for operational communications. Authenticating the identity of the IO drawer may include verifying that information stored in the IO drawer (e.g., from prior communications with the computer) matches information stored in the computer.

In other embodiments the firmware may use the inbound data to determine the connection location, on the IO drawer chassis, of cable(s) connected from the computer to the IO drawer and forming the link. The firmware may used the connection location, for example, to determine whether the link from the computer to the IO drawer is properly connected to form the PCIE link.

If the firmware determines, at 314, that it is permissible to enable operational communications between the computer and the IO drawer, at 316 the firmware enables, or initializes, the link for such communications. In embodiments enabling, or initializing, the link may include, for example, the firmware communicating to the IO drawer to enable inbound signal transmission (to the computer), or to enable reception of outbound signal transmission (to the IO drawer), on lanes of the link. In other embodiments the IO drawer, or components within the IO drawer (for example, a link module or a management controller) may enable inbound signal transmission or reception of outbound signal transmission on lanes of the link. Enabling inbound signal transmission or reception of outbound signal transmission, by the IO drawer, may be in response to the IO drawer detecting the firmware enabling outbound signal transmission of the link.

Alternatively, at 314 the firmware may determine that the IO drawer is not permitted, or not operable, to communicate with the computer. The determination may be based on the identity of the IO drawer, or based on authentication information received from the IO drawer. The firmware, at 314, may determine that the locations of the cable(s) from the computer are not connected properly to the IO drawer. Accordingly, at 318, the firmware disables the link for operational communications between the computer and the IO drawer.

Disabling the link may include disabling signal transmission on all outbound channels included in the link, or may include disabling signal reception on all inbound channels included in the link. The firmware may use a sideband link to disable the signal transmission on the inbound channels or disable signal reception on the outbound channels of the link at the IO drawer.

Figure 4:
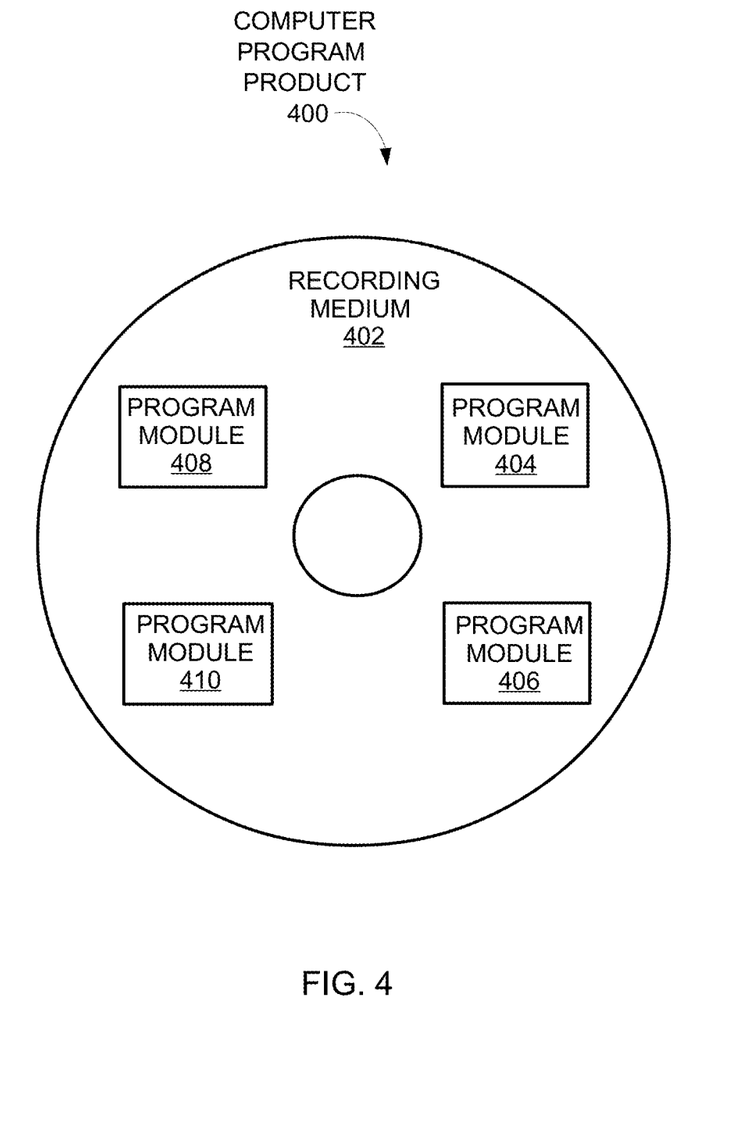
FIG. 4 is a block diagram illustrating a computer program product that may implement features of the disclosure.

FIG. 4 depicts an article of manufacture or computer program product 400 that is an embodiment of the invention. The computer program product 400 may include a recording medium 402, and the recording medium 402 may store program modules 404, 406, 408, and 410 for a computer to carry out the aspects of the invention. The recording medium 402 may be a CD ROM, DVD, tape, diskette, non-volatile or flash memory, storage medium accessed by a network connection, or other similar computer readable medium for containing a program product.

A sequence of program instructions within, or an assembly of one or more interrelated modules defined by, the program modules 404, 406, 408, or 410 may direct a computer to implement the aspects of the invention including, but not limited to, the structures and operations illustrated and described in the present disclosure.

The present invention may be embodied as a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause the computer, other programmable apparatus, or other device to perform a series of operational steps to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The invention claimed is:

1. A method for enabling communications on a signaling link, the method comprising:

disabling, by a sideband link and prior to establishment of authenticated operational communication and during outbound channels of the signaling link conveying signals, signal transmission on the outbound channels of the signaling link connecting a first link device to a second link device, wherein the sideband link is on a separate cable from the signaling link;

disabling, by the sideband link and prior to establishment of authenticated operational communication, signal transmission on the inbound channels of the signaling link, the inbound channels conveying signals from the second link device to the first link device;

enabling, by the sideband link and prior to establishment of operational communication, signal transmission on only a first outbound channel, the first outbound channel included in the outbound channels;

transmitting, by the sideband link and prior to establishment of authenticated operational communication and on the first outbound channel, an outbound sequence of signals, the outbound sequence of signals forming outbound data;

enabling, by the sideband link and prior to establishment of authenticated operational communication signal transmission on only a first inbound channel, the first inbound channel included in the inbound channels;

receiving, by the sideband link on the first inbound channel and prior to establishment of authenticated operation communication, an inbound sequence of signals, the inbound sequence of signals forming inbound data to establish operational communication;

establishing, based on a key present in the inbound sequence of signals, authenticated operation communication is permissible; and enabling, based on the inbound sequence of signals and based on the established operational communication, the outbound channels other than the first outbound channel and the inbound channels other than the first inbound channel of the signaling link to perform authenticated operational communications between the first link device and the second link device.

2. The method of claim 1 further comprising:

selecting a second outbound channel, the second outbound channel included in the outbound channels; and transmitting, on the second outbound channel, a sequence of clock signals, the sequence of clock signals operating to synchronize transmission of the outbound sequence of signals.

3. The method of claim 1 further comprising:

selecting a second inbound channel, the second inbound channel included in the inbound channels; and receiving, on the second inbound channel, a sequence of clock signals, the sequence of clock signals operating to synchronize transmission of the inbound sequence of signals.

4. The method of claim 1 wherein the first outbound channel and the first inbound channel are included in a cable and the cable is included in a set of cables forming the signaling link.

5. The method of claim 1 wherein the inbound data includes information identifying at least one of the second link device, an electro-mechanical enclosure containing the second link device, and a connection location to which the signaling link is connected, the connection location coupled to the second link device.

* * * * *